(12) United States Patent
Nagaraj et al.

(10) Patent No.: US 9,742,329 B2
(45) Date of Patent: Aug. 22, 2017

(54) CURRENT REGULATION IN MOTORS

(71) Applicant: Texas Instruments Incorporated, Dallas, TX (US)

(72) Inventors: Sudhir Nagaraj, Dallas, TX (US); Anuj Jain, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 55 days.

(21) Appl. No.: 14/689,507

(22) Filed: Apr. 17, 2015

(65) Prior Publication Data

US 2015/0303850 A1    Oct. 22, 2015

Related U.S. Application Data

(60) Provisional application No. 61/980,661, filed on Apr. 17, 2014.

(51) Int. Cl.

| H02P 8/00 | (2006.01) |
|---|---|
| G05B 19/40 | (2006.01) |
| H02P 7/29 | (2016.01) |
| H02P 8/22 | (2006.01) |
| H02P 8/12 | (2006.01) |

(52) U.S. Cl.
CPC ............ *H02P 7/29* (2013.01); *H02P 8/22* (2013.01); *H02P 8/12* (2013.01)

(58) Field of Classification Search
CPC ........................................................ H02P 7/29
USPC ....................................................... 318/696
See application file for complete search history.

(56) References Cited

U.S. PATENT DOCUMENTS

| 4,164,697 A * | 8/1979 | Everett .............. G05B 19/40 318/400.23 |
|---|---|---|
| 9,397,597 B2 * | 7/2016 | Qu ........................ H02P 8/12 |
| 2003/0067280 A1 * | 4/2003 | Wang ....................... H02P 8/12 318/685 |
| 2007/0152515 A1 * | 7/2007 | Motherway ......... H02K 41/031 310/12.22 |
| 2012/0274261 A1 * | 11/2012 | Dwersteg ............... H02P 27/10 318/696 |

* cited by examiner

*Primary Examiner* — Bentsu Ro
*Assistant Examiner* — Zemenay Truneh
(74) *Attorney, Agent, or Firm* — Lawrence J. Bassuk; Charles A. Brill; Frank D. Cimino

(57) ABSTRACT

A motor controller that includes a processing device and a drive circuit. The drive circuit may include a plurality of switches, a motor winding, and a current sensor coupled together in an H-bridge configuration. The processing device is configured to cause a drive current to drive through the motor winding for a minimum amount of time. The processing device is also configured to compare the current through the current sensor to a threshold value at the minimum amount of time. The processing device is also configured to, based on the current being at or above the threshold value at the minimum amount of time, stop the drive current for an off period of time and cause a first decay of the current for a first percentage of the off period of time and a first slow decay for a second percentage of the off period of time.

14 Claims, 5 Drawing Sheets

CURRENT REGULATION IN MOTORS

CROSS-REFERENCE TO RELATED APPLICATIONS

The present application claims priority to U.S. Provisional Patent Application No. 61/980,661, filed Apr. 17, 2014, titled "A Novel Real Time Modifying Decay Mechanism For Current Regulation In Stepper Motors," which is hereby incorporated herein by reference in its entirety.

BACKGROUND

Electric motors, including brushless DC electric motors, convert electrical energy into mechanical energy to rotate a shaft. Certain brushless DC electric motors, such as stepper motors, convert input impulses, typically through pulse-width modulation (PWM), into defined steps or increments in the shaft position. In order to rotate the shaft, an electromagnet is given power, attracting the teeth of the gear connected to the shaft. A second electromagnet is then energized causing the gear to rotate to align with the second electromagnet thereby rotating the shaft. Thus, shaft position may be controlled by regulating current flowing through motor windings in the motor.

SUMMARY

The problems noted above are solved in large part by systems and methods for regulating current decay in motors. In some embodiments, a motor controller includes a processing device and a drive circuit coupled to the processing device. The drive circuit may include a plurality of switches, a motor winding, and a current sensor coupled together in an H-bridge configuration. The processing device is configured to cause a drive current to drive through the motor winding for a minimum amount of time. The processing device is also configured to compare the current through the current sensor to a threshold value at the minimum amount of time. The processing device is also configured to, based on the current being at or above the threshold value at the minimum amount of time, stop the drive current for an off period of time and cause a first decay of the current in the drive circuit for a first percentage of the off period of time and a first slow decay in the drive circuit for a second percentage of the off period of time.

Another illustrative embodiment is a drive circuit that includes a first switch coupled to a second, third, and fourth switch. The drive circuit also includes a motor winding coupled to the first, second, third, and fourth switches, and a sense resistor. The first, second, third and fourth switches, the motor winding, and the sense resistor are configured as an H-bridge. The first and fourth switches are configured to be closed for a minimum amount of time to drive current through the motor winding. Based on current through the sense resistor being at or above a threshold value at the minimum amount of time, the first and fourth switches are configured to open for a predetermined off period of time stopping the drive current. Based on current through the sense resistor being at or above a threshold value at the minimum amount of time, the second and third switches are configured to close for a first percentage of the off period of time causing a first fast decay of the current in the drive circuit. Based on current through the sense resistor being at or above a threshold value at the minimum amount of time, the third and fourth switches are configured to close for a second percentage of the off period of time causing a slow decay of the current in the drive circuit.

Yet another illustrative embodiment is a motor comprising a motor controller configured to generate an electromagnetic field and a gear coupled to the motor controller. The gear is configured to be attracted to the electromagnetic field to initiate into mechanical shaft rotation. The motor controller includes a drive circuit and a processing device. The motor controller is configured as an H-bridge and is configured to cause a drive current to drive through the drive circuit for a first minimum amount of time. The motor controller is also configured to compare the current through the drive circuit to a threshold value at the first minimum amount of time. The motor controller is also configured to, based on the current through the drive circuit being at or above the threshold value at the first minimum amount of time, stop the drive current for a first of period of time and cause a first fast decay of the current in the drive circuit for a first percentage of the first off period of time and a first slow decay of the current in the drive circuit for a second percentage of the first off period of time.

BRIEF DESCRIPTION OF THE DRAWINGS

For a detailed description of exemplary embodiments, reference will now be made to the accompanying drawings in which.

NOTATION AND NOMENCLATURE

Figure 1:
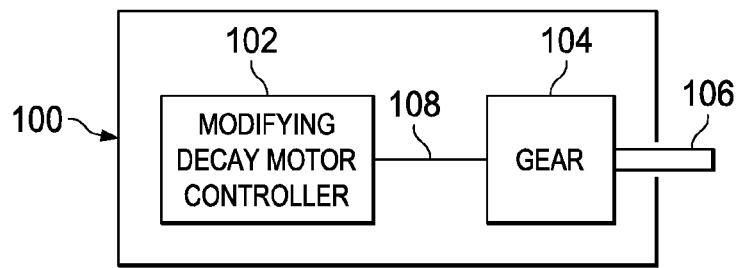
FIG. 1 shows a block diagram of an illustrative motor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Electric motors, and in particular, brushless DC motors such as stepper motors are in use in a wide variety of applications including: surveillance cameras, other cameras, video cameras, printers, robotics, etc. An H-bridge may be utilized to drive the motor windings of a stepper motor which, in turn, produces electromagnetic fields that allow for the rotation of a shaft in a precise manner. However, once the drive current is stopped in the H-bridge circuit, a recirculation current is produced due to the inductive nature of the motor windings. Conventional decay schemes apply a fixed percentage of fast decay and slow decay as a mixed decay scheme. These conventional systems typically tend to have an excess percentage of fast decay so as to handle peak currents or step transitions. This leads to compromised current regulation at lower current levels. Additionally, conventional systems do not differentiate between step transitions and current regulation in a given step. Thus, when a step occurs, the circuit may reach a new lower current level slower than is optimal. Therefore, there is a need for a system that is capable of real time decay modification within the H-bridge circuit.

As discussed, that is capable of real time decay modification within the H-bridge circuit during the time the drive current is not flowing is desirable. This system may drive a current through the H-bridge circuit (sometimes called the drive circuit) for at least a minimum amount of time. Following the minimum amount of time, the current flowing through the drive circuit is compared with a threshold value. Once the current reaches this threshold level, the drive current is stopped and a fast decay, the duration of which depends on when the current through the drive circuit reaches the threshold level in the current cycle and in previous cycles, is initiated followed by a slow decay to regulate the current through the drive circuit. Each cycle's fast decay is longer than the previous cycle's fast decay, so long as the current through the drive circuit is at or above the threshold value at the minimum amount of time in the current cycle and in the immediate previous cycle. Once the current through the drive circuit is below the threshold value at the minimum amount of time, the length of the fast decay shortens, and may become zero, until the current through the drive circuit is at or above the threshold value at the minimum amount of time. For step transitions, the system may increase the amount of time that a fast decay may occur, thus reducing the amount of time to effectuate the step transition.

FIG. 1 shows a block diagram of an illustrative motor 100 in accordance with various embodiments. Motor 100 may be any type of electric motor. In some embodiments, motor 100 is a brushless DC electric motor, and more particularly, a stepper motor. Motor 100 includes modifying decay motor controller 102 coupled to gear 104 and shaft 106. Motor controller 102 is configured to generate one or more electromagnetic fields 108 that are received by gear 104. More particularly, motor controller 102 may include a plurality of electromagnets that each, when energized, produces an electromagnetic field 108 that attracts the teeth of gear 104.

Gear 104 is coupled to shaft 104. Gear 104 is attracted to the electromagnetic fields 108 generated by motor controller 102. More particularly, an electromagnet within motor controller 102 may be energized, which attracts the teeth of the gear 104. A second electromagnet within motor controller 102 then may be energized while power is removed from the first electromagnet. This causes the gear 104 to rotate to align with the second electromagnet because the gear is attracted to the second electromagnet's electromagnetic field. Shaft 106 is coupled to gear 104 and rotates as the gear 104 rotates. In this way, motor controller 104 acts to control the rotation of shaft 106.

Shaft 106 may be connected to any device that may rotate. Some such devices include cameras, video cameras, printers, and robotics. As shaft 106 rotates, the devices rotate as well.

Figure 2:
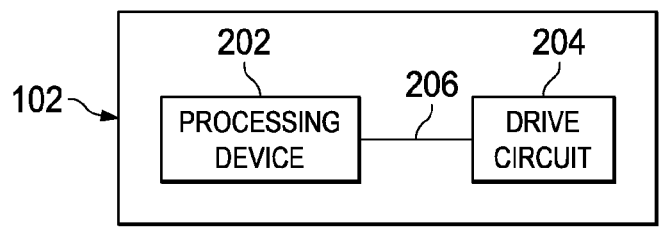
FIG. 2 shows a block diagram of an illustrative motor controller in accordance with various embodiments.

FIG. 2 shows a block diagram of an illustrative modifying decay motor controller 102 in accordance with various embodiments. Motor controller 102 may include processing device 202 coupled to drive circuit 204. While only one processing device 202 and one drive circuit 204 are shown in FIG. 2, any number of processing devices and drive circuits may be present in motor controller 102. Processing device 202 is configured to control drive circuit 204 through signal 206. Signal 206 may be provided through a direct wired connection or through a wireless connection.

Processing device 202 is hardware that may carry out computer instructions by performing, for example, arithmetic, logical, and input/output (I/O) operations for motor controller 102. Processing device 202 may include an embedded controller, a central processing unit (CPU), a semiconductor-based processing device, a graphics processing unit (GPU), a microcontroller, a dedicated state machine or any other hardware devices suitable for processing. Additionally, processing device 202 may include a single processor, multiple processors, a single computer, a network of computers, or any other type of processing device. For example, processing device 202 may include multiple cores on a chip, multiple cores across multiple chips, multiple cores across multiple devices, or combinations thereof. Processing device 202 may include at least one integrated circuit (IC), other control logic, other electronic circuits, or combinations thereof that include a number of electronic components.

Figure 3:
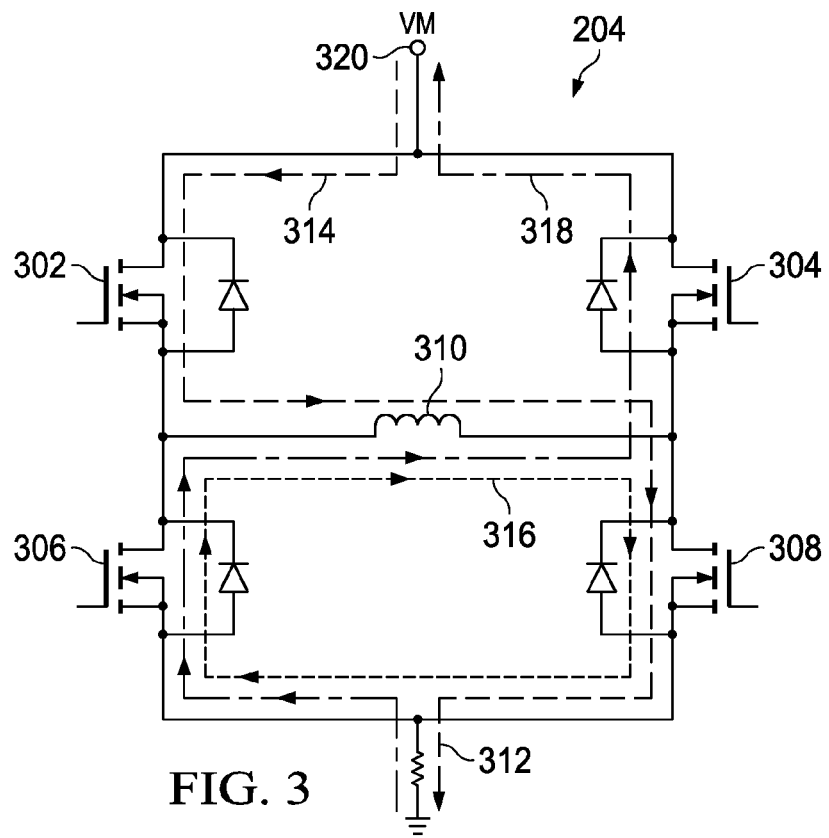
FIG. 3 shows a circuit diagram of an illustrative drive circuit in accordance with various embodiments.

FIG. 3 shows a circuit diagram of an illustrative drive circuit 204 in accordance with various embodiments. Drive circuit 204 may include switches 302-308, motor winding 310, and sense resistor 312 configured in an H-bridge configuration. That is drive circuit 204 is configured such that a voltage applied to the drive circuit 204 may be applied across motor winding 310 in either direction. Power is supplied to drive circuit 204 in the form of voltage 320.

Switches 302-308 may be any type of electrical switches. In some embodiments, each of switches 302-308 may be a field-effect transistor (FET) and more particularly may be an enhanced n-channel metal-oxide semiconductor field-effect (NMOS) transistor. In alternative embodiments, switches 302-308 may be any other type of switch including all types of NMOS transistors, a p-channel metal-oxide-semiconductor field-effect (PMOS) transistor, a p-type junction gate field-effect transistor (PJFET), a n-type junction gate field-effect transistor (NJFET), and a bipolar junction transistor (BJT) (including PNP and NPN transistors).

As an H-bridge configuration, when switches 302 and 308 are closed (i.e., on, conducting) and switches 304 and 306 are open (i.e., off, not conducting), drive current 314 flows through switch 302, motor winding 310, switch 308, and sense resistor 312. Motor winding 310 may be a winding of wire into a coil to act as an inductor. As the drive current 314 flows through motor winding 310, electromagnetic field 108 is generated. The current through sense resistor 312 is monitored by processing device 202 (e.g., as a voltage across sense resistor 312) or by any other current comparison device. In alternative embodiments, any other type of current sensor or methods for sensing current may be utilized to monitor the current flowing through drive circuit 204. When the current reaches a threshold value, the drive current 314 is interrupted by opening switches 302 and 308. Thus, drive current 314 does not flow through motor winding 310 after switches 302 and 308 are opened. The drive current 314 threshold value may be a predetermined, programmable value that is set to regulate the current in drive circuit 204. After a set, predetermined off period of time which may be programmable and set by the user, processing device 202 causes drive current 314 to again flow by closing switches 302 and 308. In some embodiments, this off period of time may be 20 μs.

During the off period of time when drive current 314 is temporarily interrupted, because motor winding 310 acts as an inductor, current continues to flow as recirculation current in drive circuit 204. Because this recirculation current is flowing through motor winding 310, electromagnetic field 108, while weakening, is still present even when not desired. In order to lower this recirculation current, the recirculation current is caused to decay by drive circuit 204. When switches 304 and 306 are closed, a fast decay occurs. During a fast decay, current 318 flows from sense resistor 312 through switch 306, motor winding 310 and switch 304. Thus, the switches 302-308 in drive circuit 204 reverse state from when drive current 314 flows through drive circuit 204. Fast decay causes the amplitude of the current within drive circuit 204 to reduce (i.e., discharge) at a comparatively fast rate. However, fast decay may lead to higher ripple. When switches 306 and 308 are closed, a slow decay occurs. During a slow decay, current 316 flows in a loop through switch 306, motor winding 310, and switch 308. Slow decay leads to a discharge of the current in drive circuit 204 at a slower rate than a fast decay. This allows for better ripple characteristics than a fast decay, but the recirculation current remains in drive circuit 204 for a longer period of time.

Figure 4:
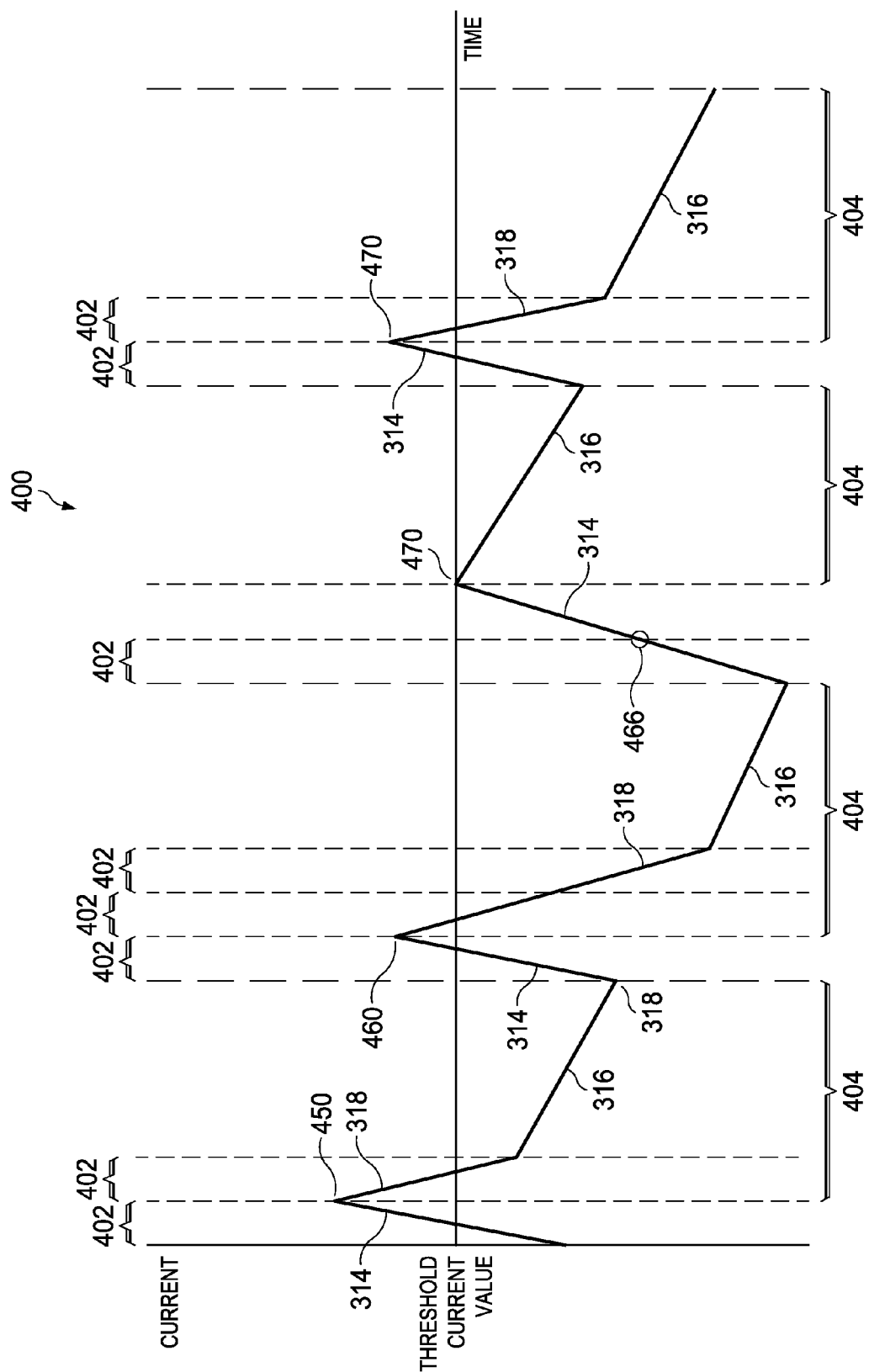
FIG. 4 shows an example current versus time curve for current regulation in a drive circuit in accordance with various embodiments.

FIG. 4 shows an example current versus time curve 400 for current regulation within a certain step in a drive circuit 204 in accordance with various embodiments. Processing device 202 causes switches 302 and 308 to close and drive current 314 flows through drive circuit 204. Once a minimum amount of time 402 elapses, the current flowing through sense resistor 312 is compared, by processing device 202, with a threshold value of current. The minimum amount of time 402 may be a predetermined, programmable amount of time that the drive current 314 runs through drive circuit 204. The minimum amount of time 402 may be preselected by a user and in some embodiments may be 1 μs. Because current cannot be accurately measured due to the noise from the switching in drive circuit 204, in some embodiments, the minimum amount of time 402 is based on the amount of time it takes to accurately measure current through sense resistor 312.

If the current through sense resistor 312 is at or above the threshold value at the minimum amount of time 402, as it is in the example shown in FIG. 4 at point 450, processing device 302 causes switches 302 and 308 to open, stopping drive current 314. Processing device 302 also causes switches 304 and 306 to close, starting a fast decay with current 318 flowing through drive circuit 204. Additionally, off period of time 404 begins. The fast decay may be set for a certain percentage of the off period of time 404. In some embodiments, the fast decay may be set for the minimum amount of time 402. Once the fast decay ends, processing device 202 causes switch 304 to open and closes switch 308, leaving switches 306 and 308 closed and switches 302 and 304 open. This causes a slow decay with current 316 flowing through drive circuit 204 for a percentage of the off period of time 404. In some embodiments, the slow decay may occur during the remainder of the off period of time 404 that is not in a fast decay.

After the off period of time 404 has elapsed, processing device 202 again causes drive current 314 to flow through drive circuit 204 utilizing the switching action discussed previously. Again, at the minimum amount of time 402, the current through sense resistor 312 is compared to the threshold value. As shown at point 460 in the example shown in FIG. 4, the current through sense resistor 312 is at or above the threshold value; therefore, processing device 202 causes drive current 314 to stop and initiates a fast decay. Because the previous cycle also had a current through sense resistor 312 higher than the threshold value at the minimum amount of time 404, processing device 202 causes the fast decay to be a longer duration than the fast decay in the previous cycle. In other words, the fast decay is a longer percentage of the off period of time 404 than in the previous cycle. In some embodiments, if the previous cycle also had a current through sense resistor 312 higher than the threshold value at the minimum amount of time 404, the fast decay may be two times the minimum amount of time 402. Once the fast decay ends, processing device 202 causes a slow decay for a percentage of the off period of time 404. In some embodiments, the slow decay may occur during the remainder of the off period of time 404 that is not in a fast decay. Because the fast decay during this cycle is longer than in the previous cycle, the slow decay is shorter than in the previous cycle.

After the off period of time 404 has elapsed, processing device 202 again causes drive current 314 to flow through drive circuit 204 utilizing the switching action discussed previously. In the example shown in FIG. 4, at the minimum amount of time 402, the current through sense resistor 312 is not at or above the threshold value as shown at point 466. In this case, processing device 202 continues to monitor and compare the current in sense resistor 312 to the threshold value. Additionally drive current 314 continues to flow through drive circuit 204. Once the current through sense resistor 312 reaches the threshold value as shown at point 470, processing device 202 causes drive current 314 to stop and the off period of time 404 begins. Because the current through sense resistor 312 was not at or above the threshold value at the minimum amount of time 402 during this cycle, a slow decay may begin and it may be for the entire duration of the off period of time 404. In alternative embodiments, a fast decay may be caused by processing device 202, once the current through sense resistor 312 reaches the threshold level, for a shorter duration than the fast decay in any cycle in which the current through sense resistor 312 was at or above the threshold value at the minimum amount of time 402. In this embodiment, a slow decay follows the fast decay for the remainder of the off period of time 404.

After the off period of time 404 has elapsed, processing device 202 again causes drive current 314 to flow through drive circuit 204 utilizing the switching action discussed previously. At the minimum amount of time 402, the current through sense resistor 312 is compared to the threshold value. Because the current is at or above the threshold value as shown at point 480 in the example shown in FIG. 4, processing device 202 causes drive current 314 to stop and initiates a fast decay. Because the previous cycle did not have a current through sense resistor 312 at or above the threshold value at the minimum amount of time 402, processing device 202 causes the fast decay to be the percentage of time in the original cycle in which the current through sense resistor 312 was at or above the threshold value at the minimum amount of time (e.g., the minimum amount of time 402). Once the fast decay ends, processing device 202 causes a slow decay for a percentage of the off period of time 404 (e.g., the remainder of the off period of time 404).

This process of driving drive current 314 through drive circuit 204 followed by a stop in the drive current 314 and fast decays, the duration of which depends on when the current through sense resistor 312 reaches the threshold level in the current cycle and in previous cycles, and slow decays continues while the current is regulated in drive circuit 204. Thus, each cycle's fast decay is longer than the previous cycles fast decay, so long as the current through sense resistor 312 is at or above the threshold value at the minimum amount of time 402 in the current cycle and in the immediate previous cycle. Once the current through sense resistor 312 is below the threshold value at the minimum amount of time 402, the length of the fast decay shortens until the current through sense resistor 312 is at or above the threshold value at the minimum amount of time 402 again.

Figure 5:
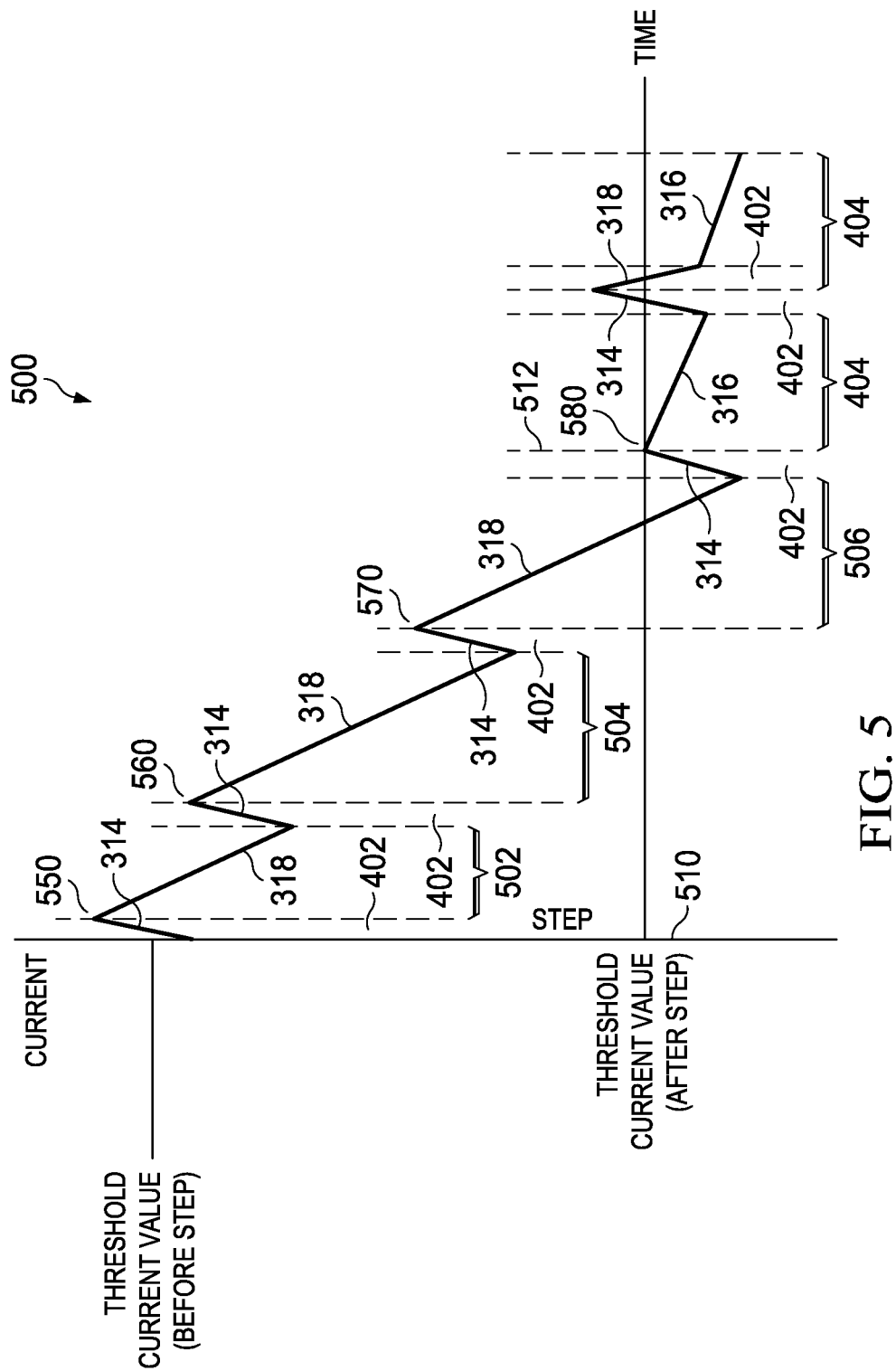
FIG. 5 shows an example current versus time curve for step current regulation in a drive circuit in accordance with various embodiments.

FIG. 5 shows an example current versus time curve 500 for step current regulation in a drive circuit 204 when the step is from a higher current step to a lower current step in accordance with various embodiments. If processing device 202 determines that a step transition is to occur in motor 100, then the current threshold value for drive circuit 204 may change. In FIG. 5, the current regulation scheme discussed above under FIG. 4 occurs with a threshold value prior to the step. At time 510, a step occurs. Here, the processing device 202 signals that a step is occurring and lowers the current threshold value in accordance with the new step.

In the example shown in FIG. 5, processing device 202 causes drive current 314 to flow through drive circuit 204 for the minimum amount of time 402 immediately following the off period of time 404 from the previous cycle elapsing utilizing the switching action discussed previously. At the minimum amount of time 402, processing device 202 compares the current through the sense resistor 312 with the new threshold value and stops drive current 314. If the current through the sense resistor is at or above the new threshold value, as it is in the example in FIG. 5 at point 550, processing device 202 causes a fast decay for a percentage of the off period of time 404 (this length of time is represented by time period 502). In some embodiments the first cycle after the step transition is initiated, the time period 502 is 25% of the off period of time 404; however, any percentage may be utilized.

Immediately following time period 502, processing device 202 again causes drive current 314 to flow through drive circuit 204 for the minimum amount of time 402. At the minimum amount of time 402, processing device 202 compares the current through the sense resistor 312 with the new threshold value and stops drive current 314. If the current through the sense resistor is at or above the new threshold value, as it is in the example in FIG. 5 at point 560, processing device 202 causes a fast decay for a percentage of the off period of time 404 (this length of time is represented by time period 504). Because the previous cycle was also above the new threshold value at point 550, in some embodiments, time period 504 is increased as compared to time period 502. In some embodiments time period 504 is 50% of the off period of time 404; however, any percentage may be utilized.

The process may then repeat such that processing device 202 again causes drive current 314 to flow through drive circuit 204 for the minimum amount of time 402. At the minimum amount of time 402, processing device 202 compares the current through the sense resistor 312 with the new threshold value and stops drive current 314. If the current through the sense resistor is at or above the new threshold value, as it is in the example in FIG. 5 at point 570, processing device 202 causes a fast decay for a percentage of the off period of time 404 (this length of time is represented by time period 506). Because the previous cycle also was above the new threshold value at point 560, in some embodiments, time period 506 is increased as compared to time period 504. In other embodiments, time period 506 remains the same as time period 504. In some embodiments time period 506 is 50% of the off period of time 404; however, any percentage may be utilized.

The process repeats until the processing device 202 determines that the current through sense resistor 312 is below the new threshold value after the minimum amount of time 402. In some embodiments, no slow decay occurs until after the processing device 202 makes this determination. This enables the current to reach the new step's threshold value quicker. Once, the processing device 202 determines that the current through sense resistor 312 is below the new threshold value after the minimum amount of time 402 (as shown at time 512 and point 580), the current regulation scheme discussed in FIG. 4 may commence at the new threshold value.

Figure 6:
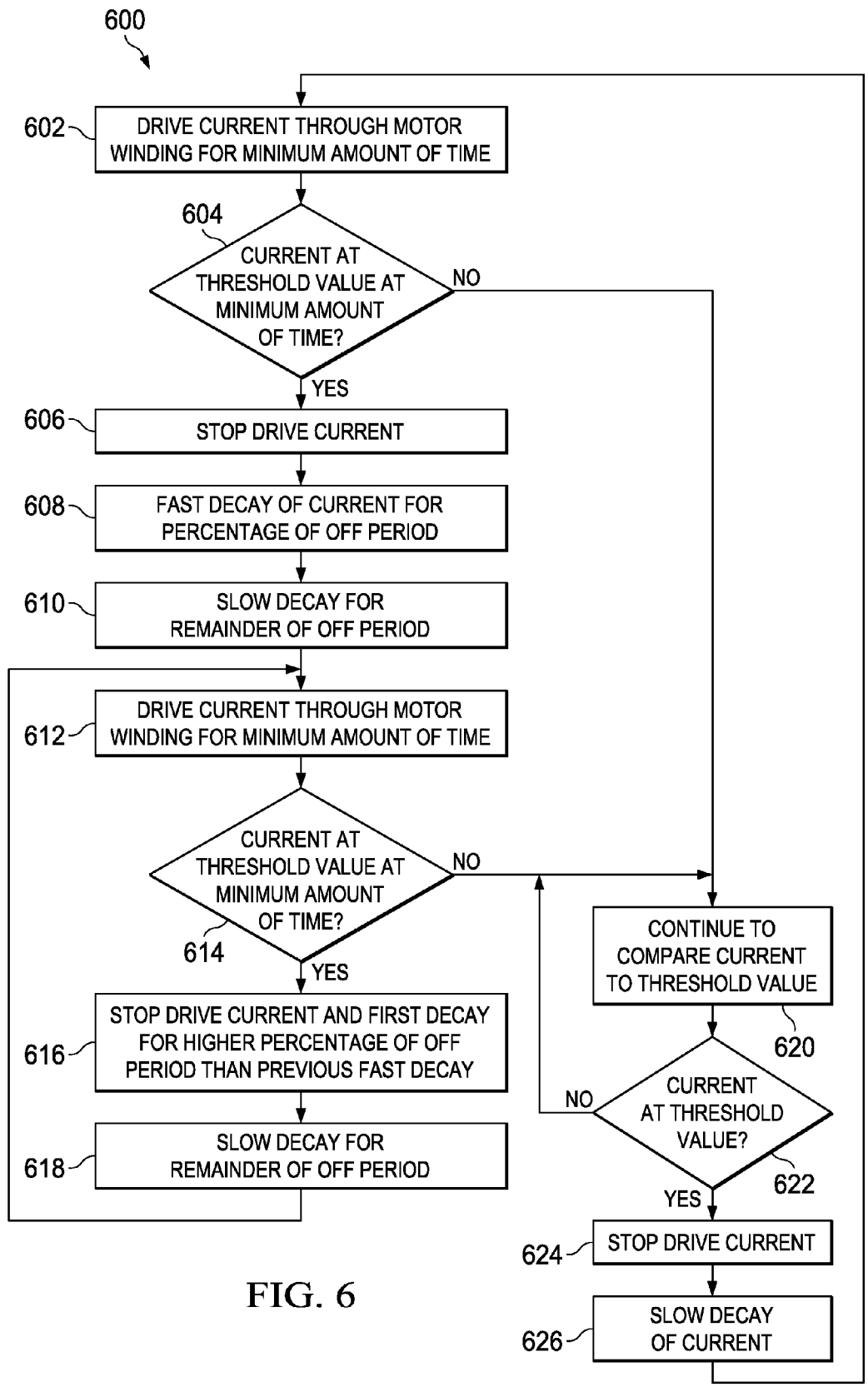
FIG. 6 shows a flow diagram of a method for regulating current decay in a drive circuit in accordance with various embodiments.
Figure 7:
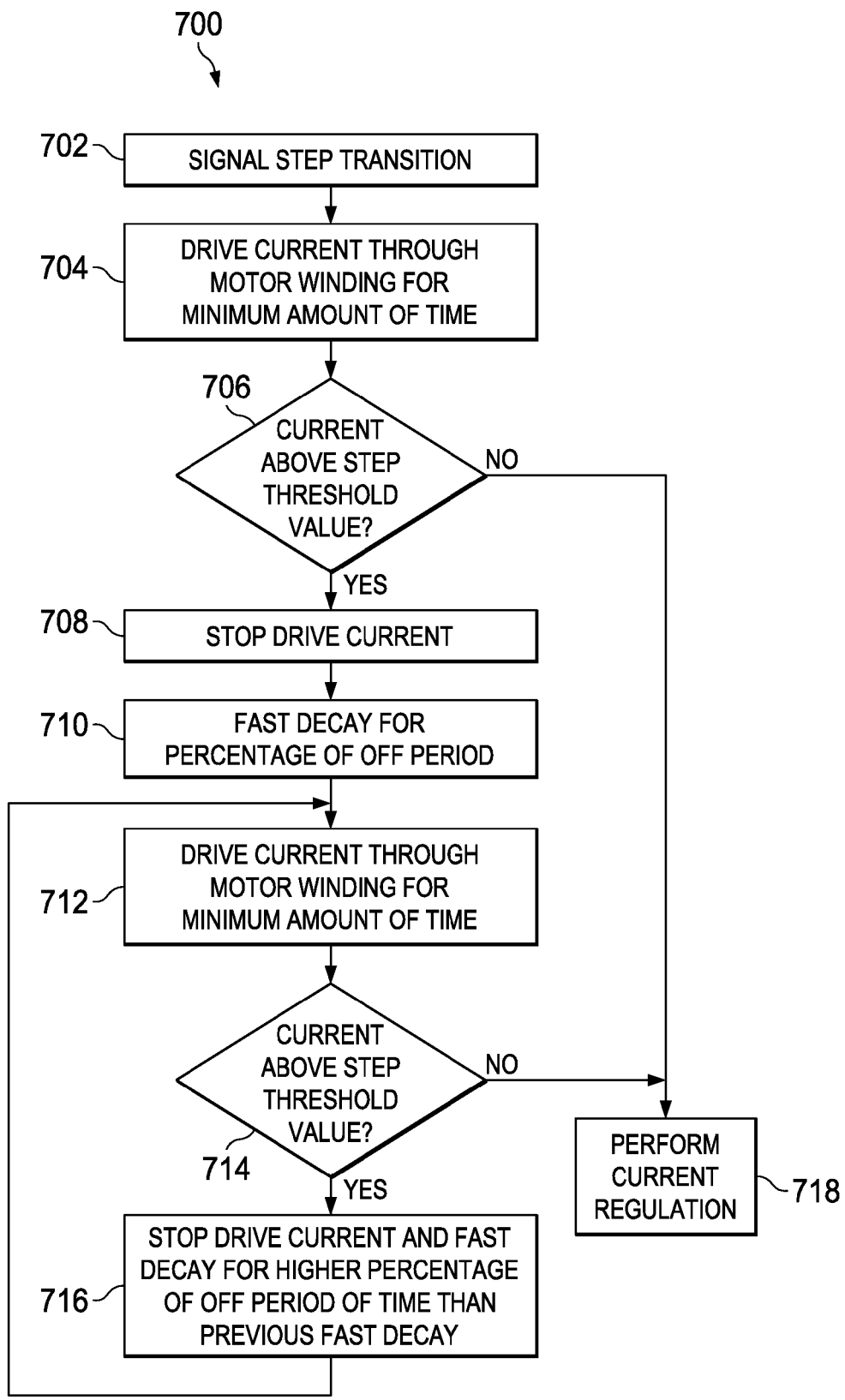
FIG. 7 shows a flow diagram of a method for regulating current decay for a step in a drive circuit in accordance with various embodiments.

FIG. 6 shows a flow diagram 600 of a method for regulating current decay in a drive circuit 204 in accordance with various embodiments. FIG. 7 shows a flow diagram 700 of a method for regulating current decay for a step in a drive circuit 204 in accordance with various embodiments. Though depicted sequentially as a matter of convenience, at least some of the actions shown in methods 600 and 700 can be performed in a different order and/or performed in parallel. Additionally, some embodiments may perform only some of the actions shown or may perform additional actions. In some embodiments, at least some of the operations of the methods 600 and 700, as well as other operations described herein, can be performed by motor controller 102 implemented by a processor executing instructions stored in a non-transitory computer readable storage medium.

The method 600 begins in block 602 with driving current through motor winding 310 for a minimum amount of time 402. In block 604, a determination is made as to whether the current through sense resistor 312 is at or above a threshold value at the minimum amount of time 402.

If the current through sense resistor 312 is not at or above a threshold value at the minimum amount of time 402 in block 604, the method continues at block 620 with continuing to compare the current through the sense resistor 312 with the threshold value. In block 622, a determination is made as to whether the current through sense resistor 312 is at or above the threshold value. If not, then the method 600 continues back in block 620 with continuing to compare the current through the sense resistor 312 to the threshold value. However, in block 622, if a determination is made that the current through sense resistor 312 is at or above the threshold value, the method 600 continues at block 624 with stopping the drive current 314. The method 600 continues at block 626 with initiating a slow decay of the current in drive circuit 204. In an embodiment, the slow decay in block 626 takes 100% of the off period of time 404. The method 600 then continues back at block 602, with driving current through motor winding 310 for a minimum amount of time 402.

If the current through sense resistor 312 is at or above a threshold value at the minimum amount of time 402 in block 604, the method 600 continues at block 606 with stopping drive current 314. In block 608, a fast decay of the current in drive circuit 610 is initiated for a percentage of the off period of time 404. In block 610, the method 600 continues with initiating a slow decay for the remainder of the off period of time 404 that is not utilized by the fast decay from block 608.

In block 612, the method 600 continues with driving current through the motor winding for the minimum amount of time 402. In block 614, a determination is made as to whether the current through sense resistor 312 is at or above a threshold value at the minimum amount of time 402. If the current through sense resistor 312 is not at or above a threshold value at the minimum amount of time 402 in block 614, the method continues at block 620, as discussed above, with continuing to compare the current through the sense resistor 312 with the threshold value.

If the current through sense resistor 312 is at or above a threshold value at the minimum amount of time 402 in block 614, the method 600 continues at block 616, with stopping drive current 314 and initiating a fast delay for a percentage of the off period of time 404 that is higher than the percentage of the off period of time 404 in block 608. In block 618, with initiating a slow decay for the remainder of the off period of time 404 that is not utilized by the fast decay from block 616. The method 600 continues in block 612 with driving current through the motor winding for the minimum amount of time 402.

The method 700 begins in block 702 with signaling that a step transition is to occur and/or occurring. In block 704, the method 700 continues with driving current through motor winding 310 for minimum amount of time 402. In block 706, a determination is made as to whether the current through sense resistor 312 is at or above the new step threshold value at the minimum amount of time 402. If the current through sense resistor 312 is not at or above the new step threshold value at the minimum amount of time 402 in block 706, the method 700 continues in block 718 with performing the current regulation scheme from method 600.

If the current through sense resistor 312 is at or above the new step threshold value at the minimum amount of time 402 in block 706, the method 700 continues in block 708 with stopping drive current 314. In block 710, a fast decay for a percentage of the off period of time 404 is initiated. In some embodiments the percentage of the off period of time 404 for the fast decay of block 710 is 25%. In block 712, method 700 continues with driving current through motor winding 310 for minimum amount of time 402. In block 714, a determination is made as to whether the current through sense resistor 312 is at or above the new step threshold value at the minimum amount of time 402. If the current through sense resistor 312 is not at or above the new step threshold value at the minimum amount of time 402 in block 714, the method 700 continues in block 718 with performing the current regulation scheme from method 600.

If the current through sense resistor 312 is at or above the new step threshold value at the minimum amount of time 402 in block 714, the method 700 continues in block 716 with stopping drive current 314 and initiating a fast decay for a percentage of the off period of time 404 that is higher than the percentage of the off period of time 404 in block 710. The method 700 then continues in block 712 as discussed above. In an embodiment, no slow decay is initiated after the signal that a step transition is to occur in block 702 and prior to the current through sense resistor 312 being below the new step threshold value at the minimum amount of time 402 in block 706 and/or 714.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A motor controller, comprising:
   a drive circuit including a plurality of switches, a motor winding, and a current sensor in an H-bridge configuration; and
   a processing device coupled to the drive circuit and causing cycles of a drive current through the drive circuit;
   in each cycle the processing device causing a drive current through the drive circuit for a minimum amount of time and causing no current during an off period of time, during the off period of time the processing device causing a fast decay for a first duration followed by a slow decay for a second duration of a back current in the drive circuit;
   the processing device causing a comparison of the drive current through the current sensor to a threshold current at the end of each minimum amount of time; and
   the processing device varying the first duration and the second duration in each cycle based on the comparison of the drive current to the threshold level for a current cycle and an immediate previous cycle.

2. The motor controller of claim 1, in which the processing device causes the first duration to be shortened and the second duration to be lengthened for that cycle based on the drive current being below the threshold level for that cycle.

3. The motor controller of claim 1, in which the processing device causes the first duration to be reduced to zero and the second duration to be lengthened to the off period for that cycle based on the drive current being below the threshold level for that cycle.

4. The motor controller of claim 1, in which the processing device cause the first duration to be equal to the minimum amount of time for that cycle.

5. The motor controller of claim 1, in which the processing device causes the first duration to be lengthened and the second duration to be shortened for that cycle based on the drive current being above the threshold level for that cycle and an immediate previous cycle.

6. The motor controller of claim 1, in which each of the plurality of switches is a field effect transistor.

7. The motor controller of claim 1, in which the processing device causes a change in the threshold level.

8. A drive circuit, comprising:
   a first switch coupled to a second, third, and fourth switch;
   a motor winding coupled to the first, second, third, and fourth switches;
   a current sensor coupled to the first, second, third, and fourth switches, and to the motor winding, the first, second, third, and fourth switches, current sensor, and the motor winding being configured as an H-bridge;
   in which the first and fourth switches are configured to be closed for a minimum amount of time to drive a drive current through the motor winding and through the current sensor, in each of consecutive cycles and the first and fourth switches are configured to open for a predetermined off period of time stopping the drive current through the motor winding and the current sensor in each of the consecutive cycles;

in which the second and third switches are configured to close for a first percentage of the off period of time causing a first fast decay of the current in the drive circuit, and the third and fourth switches are configured to close for a second percentage of the off period of time causing a slow decay of the current in the drive circuit in each cycle; and the first percentage and the second percentage in each cycle being based on the comparison of the drive current to a threshold level for that cycle and an immediate previous cycle.

9. The drive circuit of claim 8, in which, based on the current through the drive circuit being below the threshold value at the minimum amount of time, the first and fourth switches are configured to remain closed to continue to drive current through the motor winding until the current through the drive circuit reaches the threshold value.

10. The drive circuit of claim 9, in which, based on the current through the drive circuit reaching the threshold value, the third and fourth switches are configured to close to cause a slow decay for an increased second percentage and a fast decay for a decreased first percentage.

11. The drive circuit of claim 8, in which the minimum amount of time the drive current is driven through the current winding is predetermined.

12. The drive circuit of claim 8, in which the second percentage of the off period of time is the remaining portion of the off period of time after the first percentage of the off period has elapsed.

13. The drive circuit of claim 8, in which the threshold level changes.

14. A motor comprising;
a motor controller configured to generate an electromagnetic field;
and
a gear coupled to the motor controller, the gear configured to be attracted to the electromagnetic field to initiate mechanical shaft rotation;
the motor controller including a drive circuit, a current sensor coupled to the drive circuit, and a processing device, the drive circuit configured as an H-bridge and is configured to:
cause cycles of a drive current through the drive circuit;
in each cycle the motor controller causing a drive current through the drive circuit for a minimum amount of time and causing no current during an off period of time, during the off period of time the processing device causing a fast decay for a first duration followed by a slow decay for a second duration of a back current in the drive circuit;
the motor controller causing a comparison of the drive current through the current sensor to a threshold current at the end of each minimum amount of time; and
the motor controller varying the first duration and the second duration in each cycle based on the comparison of the drive current to the threshold level for a current cycle and an immediate previous cycle.

* * * * *